United States Patent
Mo et al.

(10) Patent No.: US 10,455,003 B2
(45) Date of Patent: Oct. 22, 2019

(54) METHOD, SERVER, AND SYSTEM FOR SHARING RESOURCE DATA (71) Applicant: TENCENT TECHNOLOGY (SHENZHEN) COMPANY LIMITED, Shenzhen (CN)

(72) Inventors: Xichang Mo, Shenzhen (CN); Zheng Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 418 days.

(21) Appl. No.: 15/300,062

(22) PCT Filed: Mar. 31, 2015

(86) PCT No.: PCT/CN2015/075446
§ 371 (c)(1),
(2) Date: Sep. 28, 2016

(87) PCT Pub. No.: WO2015/149673
PCT Pub. Date: Oct. 8, 2015

(65) Prior Publication Data
US 2017/0149866 A1   May 25, 2017

(30) Foreign Application Priority Data
Apr. 2, 2014   (CN) .......................... 2014 1 0132001

(51) Int. Cl.
*G06T 1/00* (2006.01)
*G06F 9/54* (2006.01)
(Continued)

(52) U.S. Cl.
CPC ............ *H04L 67/10* (2013.01); *G06F 3/0604* (2013.01); *G06F 3/0608* (2013.01);
(Continued)

(58) Field of Classification Search
CPC ....... H04L 67/10; H04L 29/08; G06F 3/0604; G06F 3/0631; G06F 3/0647;
(Continued)

(56) References Cited

U.S. PATENT DOCUMENTS 5,918,229 A * 6/1999 Davis .................... G06F 9/5016
705/27.1
7,117,481 B1 * 10/2006 Agesen ................... G06F 9/526
717/120

(Continued)

FOREIGN PATENT DOCUMENTS

CN           101120317 A       2/2008
CN           102955817 A       3/2013
(Continued)

OTHER PUBLICATIONS

NPL document Patent Publication-Wu et al. (CN 103605577 A, hereinafter as "Wu") published Feb. 26, 2014—(Machine translation provided by STIC) (Year: 2014).*
(Continued)

*Primary Examiner* — Brian W Wathen
(74) *Attorney, Agent, or Firm* — Anova Law Group, PLLC (57) ABSTRACT

A method, a server, and a system for sharing resource data are provided. The method includes: preconfiguring a resource configuration file, reading a preset key value and an index name in the resource configuration file; requesting a memory space from an operating system according to the preset key value to create a shared memory; and loading resource data corresponding to the index name from a magnetic disk to the shared memory, and sharing the resource data with a process of each scene server on a same physical machine.

15 Claims, 4 Drawing Sheets

(51) Int. Cl.
*H04L 29/08* (2006.01)
*G06F 3/06* (2006.01)
*G06F 9/50* (2006.01)

(52) U.S. Cl.
CPC .......... *G06F 3/0631* (2013.01); *G06F 3/0647* (2013.01); *G06F 3/0685* (2013.01); *G06F 9/544* (2013.01); *G06F 9/5016* (2013.01)

(58) Field of Classification Search
CPC ...... G06F 3/0685; G06F 3/0608; G06F 9/544; G06F 9/5016; G06F 9/54; G06F 3/06
USPC .......................................................... 709/201
See application file for complete search history.

(56) References Cited

U.S. PATENT DOCUMENTS

| | | | | |
|---|---|---|---|---|
| 2004/0193827 | A1* | 9/2004 | Mogi | G06F 9/5083 711/170 |
| 2005/0125212 | A1 | 6/2005 | Hunt et al. | |
| 2006/0184938 | A1* | 8/2006 | Mangold | G06F 9/5016 718/1 |
| 2010/0293146 | A1* | 11/2010 | Bonnet | G06F 8/60 707/640 |
| 2011/0072212 | A1 | 3/2011 | Kojima | |

FOREIGN PATENT DOCUMENTS

| | | |
|---|---|---|
| CN | 103514053 A | 1/2014 |
| CN | 103605577 A | 2/2014 |
| CN | 103645959 A | 3/2014 |

OTHER PUBLICATIONS

The World Intellectual Property Organization (WIPO) International Search Report for PCT/CN2015/075446 dated Jun. 19, 2015 pp. 1-3.

The State Intellectual Property Office of the People's Republic of China (SIPO) Office Action 1 for 201410132001.1 dated Aug. 27, 2018 8 Pages. (including translation).

* cited by examiner

FIG. 8

METHOD, SERVER, AND SYSTEM FOR SHARING RESOURCE DATA

CROSS-REFERENCE TO RELATED APPLICATION

This application claims priority of PCT Application No. PCT/CN2015/075446, filed on Mar. 31, 2015, which claims priority to a Chinese patent application No. 201410132001.1, filed on Apr. 2, 2014, the content of all of which is incorporated herein by reference in their entirety.

FIELD OF THE TECHNOLOGY

The present disclosure generally relates to the field of computer technologies, and in particular, relates to a method, a server, and a system for sharing resource data.

BACKGROUND OF THE DISCLOSURE

An online game server often corresponds to an online game client, is installed on hardware of an Internet Data Center (IDC), and provides the online game client with services of data forwarding and logic processing. A classic online game server includes a master server and multiple scene servers. A scene server mainly processes non-global logical data in an online game and processes game logical data of different local scenes.

With the development of computer technologies, one physical machine may be equipped with multiple CPU cores. The application of a multi-core CPU drives the development of data-parallel computation, thereby increasing a capability of processing logical data of an online game server. Theoretically, scene servers, having a same number of CPU cores, may be deployed on one physical machine. When processes of multiple scene servers are started, each scene server requests a physical memory from an operating system, and each scene server loads respectively needed logical data from a magnetic disk to the allocated physical memory. When a scene server is running, the logical data needed for the running is read from the physical memory of the scene server for processing, and the logical data loaded by each scene server is independent.

For a same online game, the logical data loaded by different scene servers all includes various same logical data such as planning configuration data, art resource data, and map resource data. In such a case, same logical data included in each scene server is loaded by each scene server from a magnetic disk to a respective physical memory for storage, which results in that same logical data is repeatedly loaded, and multiple physical memories are occupied, causing a huge waste of physical memories and lowering a utilization rate of a physical machine.

SUMMARY

In view of the above, the present disclosure provides a method, a server, and a system for sharing resource data, where a resource loading server loads, to a shared memory created by the resource loading server, same logical data, which is needed for a process of each scene server on a same physical machine, as resource data, so as to share the resource data with the process of each scene server, thereby saving physical memories of the physical machine.

One aspect of an embodiment of the present invention provides a method for sharing resource data, applicable to a resource loading server that comprises one or more program instructions, a memory and one or more processors, the one or more program instructions being stored in the memory and executed by the one or more processors, the method comprising: reading a preset key value and an index name of resource data from a resource configuration file, the resource configuration file being a resource configuration file preconfigured, and the resource data is same logical data needed for a process of each scene server on a same physical machine; requesting a memory space from an operating system of the resource loading server according to the preset key value to create a shared memory; loading the resource data corresponding to the index name from a magnetic disk to the shared memory; and sharing the resource data with the process of each scene server on the same physical machine.

Another aspect of an embodiment of the present invention provides a method for sharing resource data, applicable to each scene server, where the method includes:

starting a process of each scene server on a same physical machine;

reading a preset key value in a resource configuration file preconfigured by a resource loading server, the resource configuration file including the preset key value and an index name of resource data, and the resource data being same logical data needed for a process of each scene server on a same physical machine;

accessing a shared memory according to the preset key value, the shared memory being created by the resource loading server requesting, according to the preset key value, a memory space from an operating system, and the shared memory storing the resource data loaded, according to the index name, by the resource loading server from a magnetic disk; and mapping the resource data in the shared memory to a memory space.

Another aspect of an embodiment of the present invention provides a resource loading server, the server including:

a configuration unit, configured to preconfigure a resource configuration file, the resource configuration file comprising a preset key value and an index name of resource data, and the resource data being same logical data needed for a process of each scene server on a same physical machine;

a first reading unit, configured to read the preset key value and the index name of the resource data in the resource configuration file;

a creation unit, configured to request a memory space from an operating system of the resource loading server according to the preset key value to create a shared memory; and a sharing unit, configured to load the resource data corresponding to the index name from a magnetic disk to the shared memory, and share the resource data with the process of each scene server on the same physical machine.

In the embodiments of the present application, the process of each scene server on the same physical machine shares the resource data loaded from the magnetic disk, and the resource data does not need to be repeatedly loaded from the magnetic disk by a process of each different scene server, and also does not need to repeatedly occupy a physical memory allocated by the physical machine to each scene server, thereby saving a memory space of the physical machine, and increasing a utilization rate of the physical machine.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may still derive other drawings from these accompanying drawings without creative efforts.

DESCRIPTION OF EMBODIMENTS

The present disclosure discloses a method, a server, and a system for sharing resource data. A resource loading server loads, to a shared memory created by resource loading server, same logical data that is needed for a process of each scene server on a same physical machine as resource data, and shares the resource data with the each scene server, thereby increasing a utilization rate of the physical machine.

The embodiments of the present invention are described in detail below with reference to the accompanying drawings.

Figure 1:
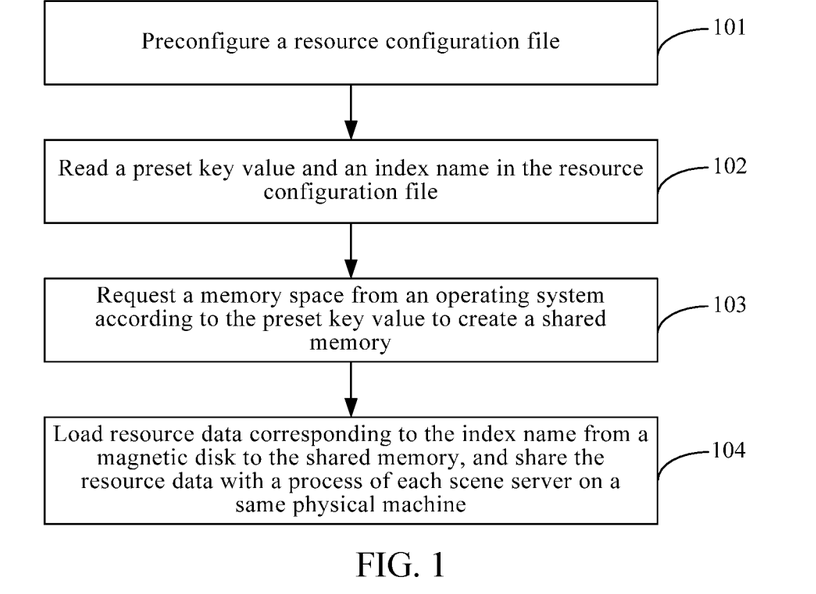
FIG. 1 is a flowchart of a method for sharing resource data according to some embodiments of the present disclosure.

FIG. 1 is a flowchart of a method for sharing resource data according to some embodiments of the present disclosure, where the method is applicable to a resource loading server. A method for creating a shared memory is described, and the method includes:

Step 101: Preconfigure a resource configuration file.

The resource configuration file includes a preset key value and an index name of resource data, and the resource data is same logical data needed for a process of each scene server on a same physical machine.

A key value is mainly for identifying a created shared memory. In a configuration file, a key value is preset as an identifier for identifying a shared memory, and the shared memory identified by the key value may be accessed according to the preset key value.

The resource data is the same logical data needed for the process of each scene server on the same physical machine, and includes planning configuration data, art resource data, map resource data, and the like. The resource data is static read-only data. During running, in addition to the resource data, the process of each scene server on the same physical machine further needs to load running data. The running data is dynamic read/write data, and each scene server needs different dynamic data. It should be noted here that each scene server and a resource loading server are not different hardware servers, and each scene server is a software program that is located on the same physical machine and processes non-global logical data in a different online game. The resource loading server is also a software program that creates a shared memory on the physical machine.

The index name of the resource data is mainly for identifying the resource data that needs to be loaded, so that when logical data is loaded, common logical data needed for each scene server is accurately loaded from a magnetic disk.

Step 102: Read a preset key value and an index name in the resource configuration file.

A resource loading server reads the preset key value and the index name in the preconfigured resource configuration file. The resource loading server refers to an application program that is installed on hardware of an internet data center (IDC) and may create a shared memory according to the preset key value and load resource data in a magnetic disk to the shared memory.

Step 103: Request a memory space from an operating system according to the preset key value to create a shared memory.

Any operating system meeting a Portable Operating System Interface (POSIX) standard is provided with a shared memory function, and may create a shared memory by using a key value. When a created process is exited, a created shared memory is not deleted by the process. The created shared memory may share data in the memory with multiple processes.

A resource loading server creates a shared memory according to the read preset key value in the resource configuration file. After receiving a request of the resource loading server, the operating system allocates a physical memory space to the resource loading server as the shared memory, and the shared memory uses the preset key value as an identifier.

Step 104: Load resource data corresponding to the index name from a magnetic disk to the shared memory, and share the resource data with a process of each scene server on a same physical machine.

A resource loading server loads, on the basis of the index name of the resource data read from the resource configuration file, the same resource data needed for the process of each scene server on the same physical machine to the created shared memory. Therefore, the resource data only needs to be loaded from the magnetic disk once, and the resource data loaded in the shared memory may be shared with the process of each scene server on the physical machine.

In the existing technology, because logical data of the processes of the scene servers is independent from each other, when the processes of the scene servers are running needed, same logical data (that is, resource data) occupies a memory space in a physical memory allocated by a physical machine to each scene server. The process of each scene server needs to load the resource data from a magnetic disk. The resource data is repeatedly loaded from the magnetic disk to the physical machine. Assuming that a group of resource data occupies a memory of 8G and there are 3 scene servers, in the existing technology, when a process of each scene server is started, a memory space of each scene server stores the resource data of 8G, and the resource data in total occupies a physical memory of 24G of the physical machine.

In contrast, when the method for sharing resource data provided in the present disclosure is used, the resource data is loaded from the magnetic disk to the shared memory. The resource data only needs to be loaded once, and only occupies a physical memory space of 8G of a physical machine. Compared with the existing technology, a physical memory space of 16G is saved, and the number of times of loading same resource data from the magnetic disk is reduced. The resource data in the shared memory may be shared among the processes of 3 scene servers. More scene servers may be deployed in the saved physical memory space, thereby increasing a capability of processing logical data of a game server.

Furthermore, a specific implementation manner of sharing the resource data with the process of each scene server is:

mapping, when the process of each scene server accesses the shared memory by using the preset key value, the resource data to the memory space of each scene server.

The process of each scene server may access, according to the preset key value, the shared memory identified by the key value. The resource data in the shared memory is mapped to the memory space of each scene server. The process of each scene server may read the resource data from the memory space of the scene server. Because the resource data is mapped from the shared memory to the memory space of each scene server and does not occupy a physical memory space of each scene server, a physical memory space of a physical machine may be saved.

Optionally, after the loading resource data corresponding to the index name from a magnetic disk to the shared memory, the method further includes:

setting a signal amount and creating a signal amount key value corresponding to the signal amount, an initial value of the signal amount being the same as the number of the running processes of the scene servers on the physical machine; and storing the signal amount in the memory space of the operating system according to the signal amount key value, so that the process of each scene server detects the signal amount from the memory space of the operating system according to the signal amount key value, and starting, when the signal amount exists and after a wait operation is successfully executed on the signal amount, the process of each scene server on the same physical machine when the signal amount exists and after a wait operation is successfully executed on the signal amount.

The initial value of the signal amount set by the resource loading server may be the same as the number of the running processes of the scene servers on the physical machine. At the same time, a signal amount key value corresponding to the signal amount is created, and according to the signal amount key value, the memory space is requested from the operating system to store the signal amount. The signal amount key value is an identifier of the memory space where the signal amount is stored, and the stored signal amount may be accessed according to the signal amount key value.

The process of each scene server obtains the signal amount key value from the resource loading server, detects the signal amount according to the signal amount key value every a period of time, and executes, when the signal amount exists and the wait operation is successfully executed on the signal amount, "process start" to start a process. The wait operation is a general-purpose operation instruction in the operating system. When the wait operation is executed on the signal amount, an operation of subtracting 1 is executed on a signal amount, and a response that the signal amount is not 0 is returned. When each scene server receives the response that the signal amount is not 0, process start is executed. After the processes of all scene servers are started, the signal amount is 0, and in this case a signal amount cannot be detected.

Such a method may be implemented that the process of each scene server is started after the resource data is loaded in the shared memory, so that the process of each scene server can access the resource data in the shared memory by using the preset key value, so as to implement a time order of executing the load resource data first and then accessing resource data.

As can be seen from the foregoing content, the present disclosure has the following beneficial effects: a resource configuration file is preconfigured, and a preset key value and an index name in the resource configuration file are read; a memory space is requested from an operating system according to the preset key value to create a shared memory; and resource data corresponding to the index name is loaded from a magnetic disk to the shared memory, and the resource data is shared with a process of each scene server on a same physical machine. The process of each scene server on the same physical machine shares the resource data loaded from the magnetic disk, and the resource data does not need to be repeatedly loaded from the magnetic disk by a process of each different scene server, and also does not need to repeatedly occupy a physical memory allocated by the physical machine to each scene server, thereby saving a memory space of the physical machine, and increasing a utilization rate of the physical machine.

Figure 2:
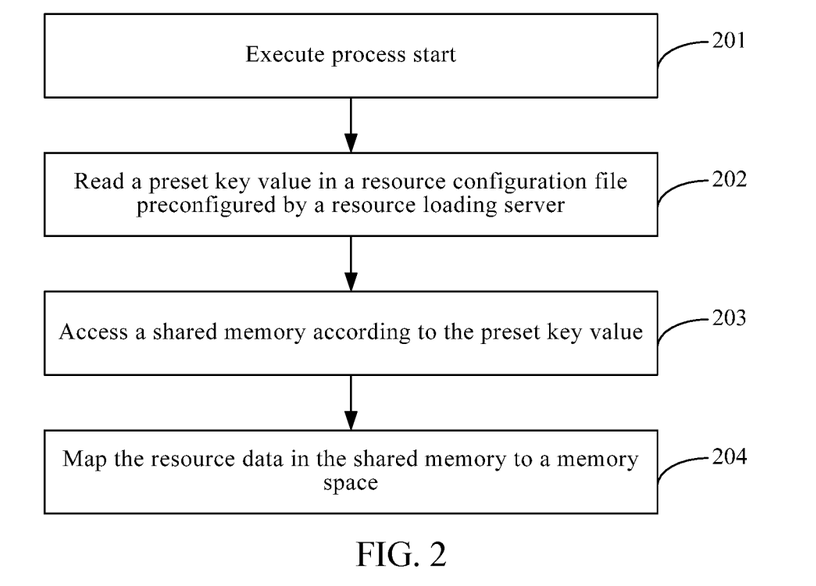
FIG. 2 is a flowchart of another method for sharing resource data according to some embodiments of the present disclosure.

FIG. 2 is a flowchart of some embodiments of a method for sharing resource data according to the present disclosure, where the method is applicable to a scene server. A method of sharing resource data by a process of the scene server is described, and the method includes:

Step 201: Execute process start.

Multiple scene servers are included in a structure of a same online game server. After a shared memory is successfully created on a resource loading server and resource data is loaded from a magnetic disk to the shared memory, a process of each scene server can access the shared memory. The two execution steps, where in one execution step, the resource loading server creates the shared memory and loads the resource data and in the other execution step, the process of each scene server accesses the shared memory, must be deployed on the basis of a strict time order, or otherwise the process of each scene server cannot share the resource data.

Start is executed for each scene server in two possible implementation manners.

A first possible implementation manner is:

receiving a start command to execute process start.

After a resource loading server creates the shared memory and accomplishes loading of the resource data, a start command of starting each scene server is manually input. After each scene server receives the start command, process start is executed. Such a manner of executing process start is relatively simple, but an error occurs easily.

A second possible implementation manner:

obtaining a signal amount key value from the resource loading server;

detecting a signal amount from a memory space of an operating system according to the signal amount key value every a preset time; and executing, when the signal amount exists and after a wait operation is successfully executed on the signal amount, process start.

An initial value of the signal amount set by the resource loading server is the same as the number of the running processes of the scene servers on a physical machine, and at the same time, a signal amount key value corresponding to the signal amount is created. The signal amount key value is for identifying a storage position of the signal amount in the memory space of the operating system.

The process of each scene server on a same physical machine obtains the signal amount key value from the resource loading server, and the signal amount is detected according to the signal amount key value every a preset time. When it is detected that the signal amount is not 0 and after the wait operation is successfully executed, process start of the scene servers is executed. When the signal amount is reset to zero, process start is completed for all scene servers on the physical machine.

Compared with the first possible implementation manner, the second possible implementation manner increases precision of executing process start on the basis of a time order.

Step 202: Read a preset key value in a resource configuration file preconfigured by a resource loading server.

The resource configuration file includes the preset key value and an index name of resource data, and the resource data is same logical data needed for a process of each scene server on a same physical machine.

The process of the scene server acquires the preset key value from the preconfigured resource configuration file. The preset key value is an identifier of a shared memory created by the resource loading server. The shared memory created by the resource loading server may be accessed according to the acquired key value.

Step 203: Access a shared memory according to the preset key value.

The shared memory is created by the resource loading server requesting, according to the preset key value, a memory space from an operating system, and the shared memory stores resource data loaded by the resource loading server from a magnetic disk according to the index name.

Step 204: Map resource data in the shared memory to a memory space.

After creating the shared memory, the resource loading server loads the resource data from a magnetic disk to the created shared memory, and therefore a process of each scene server accesses the shared memory according to the preset key value, and maps the resource data in the shared memory to a respective memory space of each scene server. When needing the resource data, the process of the scene server reads the resource data from the memory space of the scene server.

When the resource data is mapped to a memory space of the scene server, a physical memory of the scene server is not occupied, and a physical machine only needs to allocate a physical memory space, that is, a shared memory to the resource data. The resource data does not repeatedly occupy a part of physical memory in a physical memory allocated by the physical machine to each scene server. In this manner, a physical memory space of the physical machine may be saved.

Figure 3:
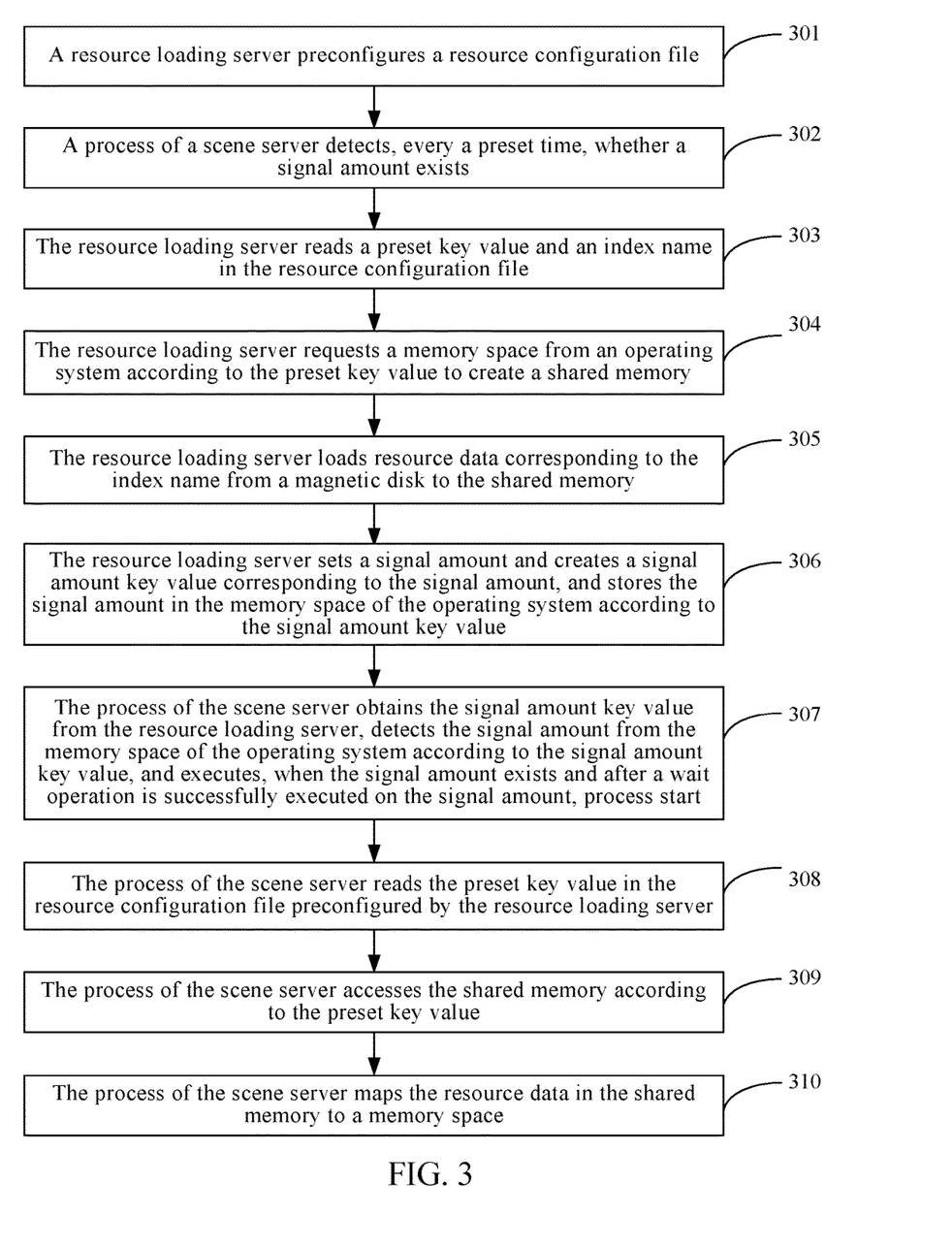
FIG. 3 is a flowchart of another method for sharing resource data according to some embodiments of the present disclosure.

FIG. 3 is a flowchart of a method for sharing resource data according to some embodiments of the present disclosure. This embodiment describes a procedure of creating a shared memory and sharing a data resource, and the method includes:

Step 301: A resource loading server preconfigures a resource configuration file.

The resource configuration file includes a preset key value and an index name of resource data, and the resource data is same logical data needed for a process of each scene server on a same physical machine.

Step 302: A process of a scene server detects, every a preset time, whether a signal amount exists.

It should be noted here that the process of the scene server detects whether a signal amount exists immediately after an entire system for sharing resource data is started. At the beginning, because the resource loading server has not loaded the resource data, in this case, the process of the scene server cannot detect a signal amount. The signal amount can only be detected after the resource loading server loads the resource data to a shared memory and sets the signal amount.

Step 303: The resource loading server reads a preset key value and an index name in the resource configuration file.

Step 304: The resource loading server requests a memory space from an operating system according to the preset key value to create a shared memory.

Step 305: The resource loading server loads resource data corresponding to the index name from a magnetic disk to the shared memory.

Step 303 to step 305 are similar to those described in FIG. 1, where reference is made to the description of FIG. 1, and are not repeated herein.

Step 306: The resource loading server sets a signal amount and creates a signal amount key value corresponding to the signal amount, and stores the signal amount in the memory space of the operating system according to the signal amount key value.

An initial value of the signal amount is the same as the number of the running processes of the scene servers on the physical machine.

Step 307: The process of the scene server obtains the signal amount key value from the resource loading server, detects the signal amount from the memory space of the operating system according to the signal amount key value, and executes, when the signal amount exists and after a wait operation is successfully executed on the signal amount, process start.

Multiple scene servers are provided in a structure of an online game. The process of each scene server obtains a signal amount key value from the resource loading server, and detects a signal amount from the memory space of the operating system according to the signal amount key value. After loading the resource data to the shared memory, the resource loading server sets a signal amount and creates a signal key value corresponding to the signal amount. In this case, the process of the scene server may detect, according to the signal key value, that the signal amount is not 0, and therefore executes the wait operation. The wait operation is to control the operating system to subtract 1 from the signal amount, and after the wait operation is successfully executed, a response that a signal amount exists is received. The scene server executes process start according to a response that the signal amount exists.

For each scene server, the existence of the signal amount is an identifier that the resource loading server has loaded the resource data to the shared memory and is ready to share the resource data with the process of each scene server and the process may be started for each scene server. An initial value of the signal amount set for the resource load data is the same as the number of the processes of the scene servers, and therefore, it means that, when the signal amount is reset to 0, processes of all scene servers in the physical machine have been started.

Step 308: The process of the scene server reads the preset key value in the resource configuration file preconfigured by the resource loading server.

Step 309: The process of the scene server accesses the shared memory according to the preset key value.

Step 310: The process of the scene server maps the resource data in the shared memory to a memory space.

Step 307 to step 310 are similar to those described in FIG. 2, where reference is made to the description of FIG. 2, and are not repeated herein.

Figure 4:
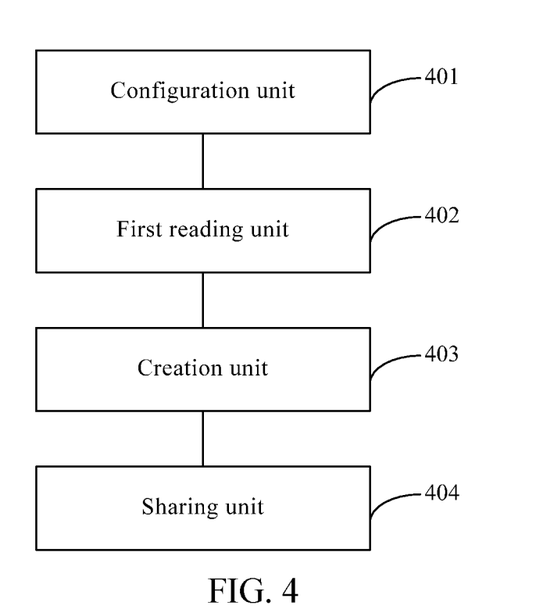
FIG. 4 is a schematic diagram of a structure of a resource loading server according to some embodiments of the present disclosure.

FIG. 4 is a schematic diagram of a structure of a resource loading server according to some embodiments of the present disclosure. The resource loading server is configured to create a shared memory, and is an apparatus corresponding to the method in FIG. 1. The server includes:

a configuration unit 401, configured to preconfigure a resource configuration file, the resource configuration file including a preset key value and an index name of resource data, and the resource data being same logical data needed for a process of each scene server on a same physical machine;

a first reading unit 402, configured to read the preset key value and the index name in the resource configuration file;

a creation unit 403, configured to request a memory space from an operating system according to the preset key value to create a shared memory; and a sharing unit 404, configured to load the resource data corresponding to the index name from a magnetic disk to the shared memory, and share the resource data with the process of each scene server on the same physical machine.

Optionally, the sharing unit 404 is specifically configured to map, when the process of each scene server accesses the shared memory by using the preset key value, the resource data to a memory space of each scene server.

Optionally, the server further includes:

a setting unit, configured to set a signal amount and create a signal amount key value corresponding to the signal amount, an initial value of the signal amount being the same as the number of the running processes of the scene servers on the physical machine; and a storage unit, configured to store the signal amount in the memory space of the operating system according to the signal amount key value, so that the process of each scene server detects the signal amount from the memory space of the operating system according to the signal amount key value, and execute, when the signal amount exists and after a wait operation is successfully executed on the signal amount, process start.

The server in FIG. 4 corresponds to the method described in FIG. 1, where reference is made to description of FIG. 1, and is not repeated herein.

Figure 5:
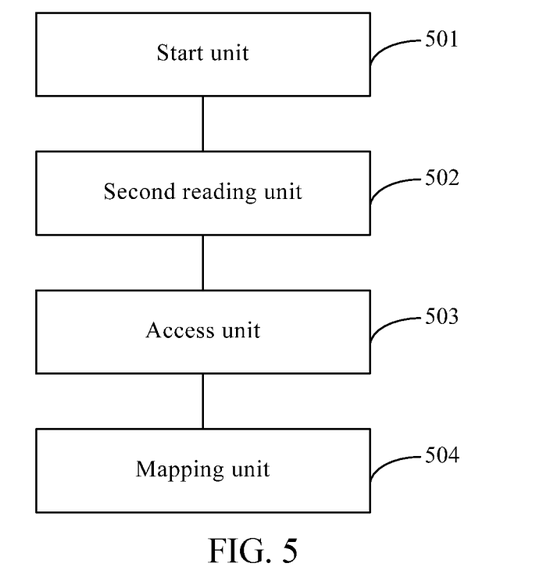
FIG. 5 is a schematic diagram of a structure of a scene server according to some embodiments of the present disclosure.

FIG. 5 is a schematic diagram of a structure of a scene server according to some embodiments of the present disclosure. The scene server is configured to map resource data in a shared memory, and is an apparatus corresponding to the method in FIG. 2. The server includes:

a start unit 501, configured to execute process start;
where optionally, there are two possible structures:
in a first possible structure, the start unit 501 includes:
a receiving subunit, configured to receive a start command; and
a first start subunit, configured to execute process start; and
in a second possible structure, the start unit 501 includes:
an acquisition subunit, configured to obtain a signal amount key value from a resource loading server;
a detection subunit, configured to detect the signal amount from a memory space of an operating system according to the signal amount key value every a preset time; and
a second start subunit, configured to execute, when the signal amount exists and after a wait operation is successfully executed on the signal amount, process start;

a second reading unit 502, configured to read the preset key value in the resource configuration file preconfigured by the resource loading server, the resource configuration file including the preset key value and an index name of resource data, and the resource data being same logical data needed for a process of each scene server on a same physical machine;

an access unit 503, configured to access a shared memory according to the preset key value, the shared memory being created by the resource loading server requesting, according to the preset key value, the memory space from the operating system, and the shared memory storing the resource data loaded, according to the index name, by the resource loading server from a magnetic disk; and a mapping unit 504, configured to map the resource data in the shared memory to a memory space.

The server in FIG. 5 corresponds to the method described in FIG. 2, where reference is made to description of FIG. 2, and is not repeated herein.

Figure 6:
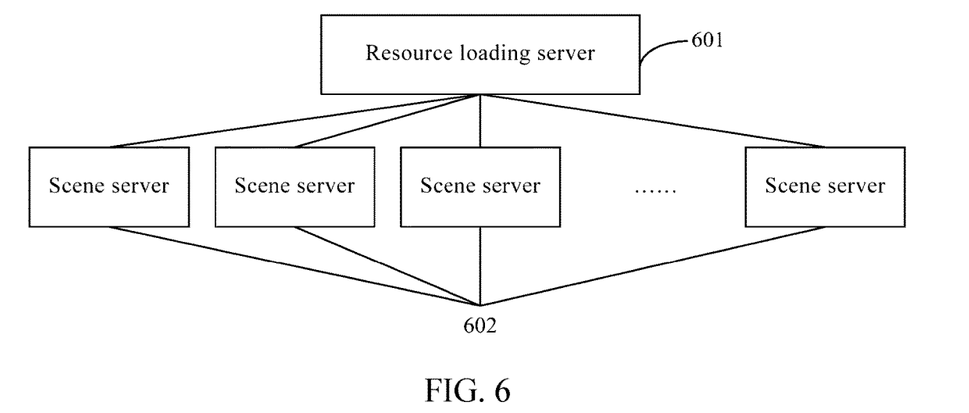
FIG. 6 is a schematic diagram of a system for sharing resource data according to some embodiments of the present disclosure.

FIG. 6 is a schematic diagram of a system for sharing resource data according to some embodiments of the present disclosure. The system is a system corresponding to the method in FIG. 3, and the system includes:

the resource loading server 601 in FIG. 4 and multiple scene servers 602 in FIG. 5.

The resource loading server 601 includes:

a configuration unit, configured to preconfigure a resource configuration file, the resource configuration file including a preset key value and an index name of resource data, and the resource data being same logical data needed for a process of each scene server on a same physical machine;

a first reading unit, configured to read the preset key value and the index name in the resource configuration file;

a creation unit, configured to request a memory space from an operating system according to the preset key value to create a shared memory;

a sharing unit, configured to load the resource data corresponding to the index name from a magnetic disk to the shared memory, and share the resource data with the process of each scene server on the same physical machine;

a setting unit, configured to set a signal amount and create a signal amount key value corresponding to the signal amount, an initial value of the signal amount being the same as the number of the running processes of the scene servers on the physical machine; and a storage unit, configured to store the signal amount in the memory space of the operating system according to the signal amount key value, so that the process of each scene server detects the signal amount from the memory space of the operating system according to the signal amount key value, and execute, when the signal amount exists and after a wait operation is successfully executed on the signal amount, process start.

The scene server 602 includes:

a start unit, configured to execute process start;

a second reading unit, configured to read the preset key value in the resource configuration file preconfigured by the resource loading server, the resource configuration file including the preset key value and an index name of resource data, and the resource data being same logical data needed for a process of each scene server on a same physical machine;

an access unit, configured to access a shared memory according to the preset key value, the shared memory being created by the resource loading server requesting, according to the preset key value, the memory space from the operating system, and the shared memory storing the resource data loaded, according to the index name, by the resource loading server from a magnetic disk;

a mapping unit, configured to map the resource data in the shared memory to a memory space;

an acquisition subunit, configured to obtain the signal amount key value from the resource loading server;

a detection subunit, configured to detect the signal amount from the memory space of the operating system according to the signal amount key value every a preset time; and a second start subunit, configured to execute, when the signal amount exists and after a wait operation is successfully executed on the signal amount, process start.

Figure 7:
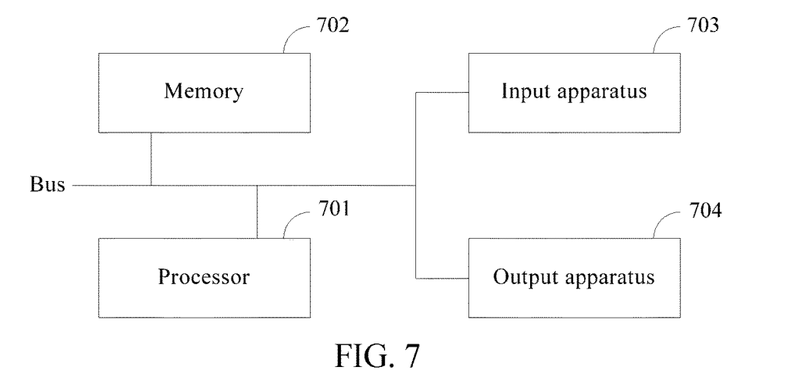
FIG. 7 is a schematic structural diagram of a resource loading server according to some embodiments of the present disclosure.

FIG. 7 is a schematic structural diagram of a resource loading server according to some embodiments of the present disclosure. The server includes:

a processor 701, a memory 702, an input apparatus 703, and an output apparatus 704. There may be one or more processors 701 in the resource loading server, and one processor is used as an example illustrated in FIG. 7. In the embodiment of the present disclosure, the processor 701, the memory 702, the input apparatus 703, and the output apparatus 704 may be connected through a bus or in another manner, and a bus connection is used in FIG. 7 as an example for illustration purposes.

The memory 702 may be configured to store a software program and module, and the processor 701 runs the software program and module stored in the memory 702 to execute various functional applications and data processing of the resource loading server. The memory 702 may mainly include a program storage area and a data storage area, where the program storage area may store an operating system, an application program needed for at least one function, and the like. In addition, the memory 702 may include a high-speed random access memory, or may further include a nonvolatile memory, for example, at least one disk storage device, a flash memory device or another volatile solid-state storage device. The input apparatus 703 may be configured to receive input digital or character information, and generate a key signal input related to a user setting and functional control of the resource loading server.

Specifically, in this embodiment, the processor 701 loads, on the basis of the following instructions, an executable file corresponding to one or more processes of application programs to the memory 702, and the processor 701 runs the application program stored in the memory 702 to implement various functions:

preconfiguring a resource configuration file, the resource configuration file including a preset key value and an index name of resource data, the resource data being same logical data needed for each scene server of a same online game;

reading the preset key value and the index name in the resource configuration file;

requesting a memory space from the operating system according to the preset key value to create a shared memory; and loading the resource data corresponding to the index name from a magnetic disk to the shared memory, and sharing the resource data with each scene server.

Optionally, the sharing the resource data with each scene server includes:

mapping, when each scene server accesses the shared memory by using the preset key value, the resource data to a memory space of each scene server.

Optionally, after the loading the resource data corresponding to the index name from a magnetic disk to the shared memory, following steps are performed:

setting a signal amount value, the signal amount value being the same as the number of scene servers started for the same online game; and returning, every time a detection signal of a scene server is received, the signal amount value to the scene server, and subtracting 1 from the signal amount value, so as to implement start of each scene server.

The resource data includes: planning configuration data, art resource data, and map resource data.

Figure 8:
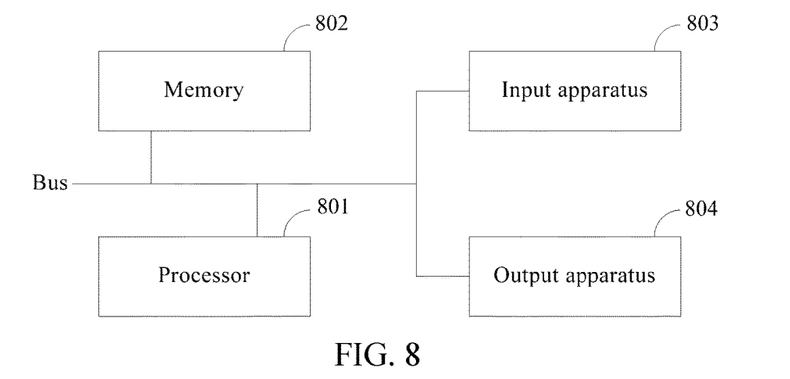
FIG. 8 is a schematic structural diagram of a resource loading server according to some embodiments of the present disclosure.

FIG. 8 is a schematic structural diagram of a resource loading server according to some embodiments of the present disclosure. The server includes:

a processor 801, a memory 802, an input apparatus 803, and an output apparatus 804. There may be one or more processors 801 in the resource loading server, and one processor is used as an example illustrated in FIG. 8. In the embodiment of the present disclosure, the processor 801, the memory 802, the input apparatus 803, and the output apparatus 804 may be connected through a bus or in another manner, and a bus connection is used as an example illustrated in FIG. 8.

The memory 802 may be configured to store a software program and module, and the processor 801 runs the software program and module stored in the memory 802 to execute various functional applications and data processing of the resource loading server. The memory 802 may mainly include a program storage area and a data storage area, where the program storage area may store an operating system, an application program needed for at least one function, and the like. In addition, the memory 802 may include a high-speed random access memory, or may further include a nonvolatile memory, for example, at least one disk storage device, a flash memory device or another volatile solid-state storage device. The input apparatus 703 may be configured to receive input digital or character information, and generate a key signal input related to a user setting and functional control of the resource loading server.

Specifically, in this embodiment, the processor 801 loads, on the basis of the following instructions, an executable file corresponding to one or more processes of application programs to the memory 802, and the processor 801 runs the application program stored in the memory 802 to implement various functions:

executing process start;

reading a preset key value in a resource configuration file preconfigured by the resource loading server, the resource configuration file including the preset key value and an index name of resource data, and the resource data being same logical data needed for each scene server of a same online game;

accessing a shared memory according to the preset key value, the shared memory being created by the resource loading server requesting a memory space from the operating system according to the preset key value, and the shared memory storing the resource data loaded, according to the index name, by the resource loading server from a magnetic disk; and mapping the resource data in the shared memory to a memory space.

Optionally, the executing process start includes:

receiving a start command to execute process start.

Optionally, the executing process start includes:

sending a detection signal to the resource loading server every a preset time, the detection signal being for detecting a signal amount value set by the resource loading server; and executing, when it is detected that the signal amount value is not 0, process start.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for sharing resource data, applicable to a resource loading server that comprises one or more program instructions, a memory and one or more processors, the one or more program instructions being stored in the memory and executed by the one or more processors, the method comprising:
   reading a preset key value and an index name of resource data from a resource configuration file, wherein the resource configuration file is a resource configuration file preconfigured, the resource data is same logical data needed for processes of scene servers on a same physical machine as the resource loading server, and each scene server runs a corresponding process;
   requesting a memory space from an operating system of the resource loading server according to the preset key value to create a shared memory;
   loading the resource data corresponding to the index name from a magnetic disk to the shared memory;
   setting a signal amount and creating a signal amount key value corresponding to the signal amount, an initial value of the signal amount being a total number of the processes corresponding to the scene servers executed on the physical machine;
   storing the signal amount in the memory space of the operating system according to the signal amount key value;
   for each scene server:
      executing a wait operation on the signal amount and subtracting 1 from the signal amount in response to the scene server accessing a non-zero signal value in the signal amount according to the signal amount key value; and
      sending a process start command to the scene server after the wait operation is completed for starting the process corresponding to the scene server; and
   sharing the resource data with the processes of the scene servers on the same physical machine, wherein the signal amount becomes 0 after all of the processes of the scene servers have been started.

2. The method according to claim 1, wherein the sharing the resource data with the processes of the scene servers on the same physical machine, comprises:
   mapping, when the process of each scene server accesses the shared memory by using the preset key value, the resource data to a memory space of each scene server.

3. The method according to claim 1, wherein the resource data comprises:
   planning configuration data, art resource data, and map resource data.

4. The method according to claim 3, wherein the physical machine is an online game server, and the planning configuration data, the art resource data, and the map resource data are data needed for an online game.

5. The method according to claim 1, wherein the resource data is static read-only data.

6. The method according to claim 1, further comprising:
   loading running data corresponding to each of the scene servers, wherein the running data is dynamic writeable data, and each scene server loads different running data.

7. A method for sharing resource data, applicable to each scene server of a plurality of scene servers on a same physical machine, the method comprising:
   reading a signal amount key value from a resource loading server on the same physical machine;
   periodically accessing a signal amount from a memory space on the same physical machine according to the signal amount key value at a preset time interval;
   if the signal amount has a non-zero value, receiving a start process command from the resource loading server and starting a corresponding process of the scene server, the start process command being sent from the resource loading server after the resource loading server executing a wait operation on the signal amount by subtracting 1 from the signal amount;
   reading a preset key value in a resource configuration file preconfigured by the resource loading server, the resource configuration file comprising the preset key value and an index name of resource data, and the resource data being same logical data needed for the plurality of scene servers on the same physical machine;
   accessing a shared memory according to the preset key value, the shared memory being created by the resource loading server according to the preset key value, the shared memory storing the resource data loaded, according to the index name, by the resource loading server from a magnetic disk; and
   mapping the resource data in the shared memory to a memory space on the scene server.

8. The method according to claim 7, wherein the resource data is static read-only data.

9. The method according to claim 7, wherein the physical machine is an online game server, and the resource data comprises:
   planning configuration data, art resource data, and map resource data needed for an online game.

10. The method according to claim 7, further comprising:
    loading running data corresponding to the scene server, the running data being dynamic writeable data specific to the scene server.

11. A computer system, comprising: a resource loading server and a plurality of scene servers, wherein:
    the resource loading server and the plurality of scene servers reside on the same physical machine;
    the resource loading server is configured to:
       read a preset key value and an index name of resource data from a resource configuration file, wherein the resource data is same logical data needed for processes of the scene servers, and each scene server runs a corresponding process;
       request a memory space of an operating system according to the preset key value to create a shared memory;
       load the resource data corresponding to the index name from a magnetic disk to the shared memory;
       set a signal amount;
       create a signal amount key value corresponding to the signal amount, an initial value of the signal amount being a total number of the processes corresponding to the scene servers; and
       store the signal amount in the memory space of the operating system according to the signal amount key value; and
    each scene server is configured to periodically access the signal amount according to the signal amount key value at a preset time interval;

the resource loading server is further configured to execute a wait operation on the signal amount to subtract 1 from the signal amount in response to one scene server accessing a non-zero signal value in the signal amount; and send a process start command to the one scene server after the wait operation is completed; and each scene server is further configured to start the corresponding process after receiving the process start command from the resource loading server, wherein the resource data is shared with the corresponding processes of the plurality of scene servers, and the signal amount becomes 0 after all of the processes of the scene servers have been started.

12. The computer system according to claim 11, wherein each scene server is further configured to:

read the preset key value in the resource configuration file;

access the shared memory according to the preset key value; and map the resource data in the shared memory to a memory space on the scene server.

13. The computer system according to claim 11, wherein the resource data is static read-only data.

14. The computer system according to claim 11, wherein the physical machine is an online game server, and the resource data comprises:

planning configuration data, art resource data, and map resource data needed for an online game.

15. The computer system according to claim 11, wherein each scene server is further configured to:

load corresponding running data, the running data being dynamic writeable data specific to the scene server, wherein each scene server loads different running data.

* * * * *